April 16, 1957 C. W. WHERRY 2,788,965
KNEE ACTION MOUNTINGS
Filed May 17, 1954
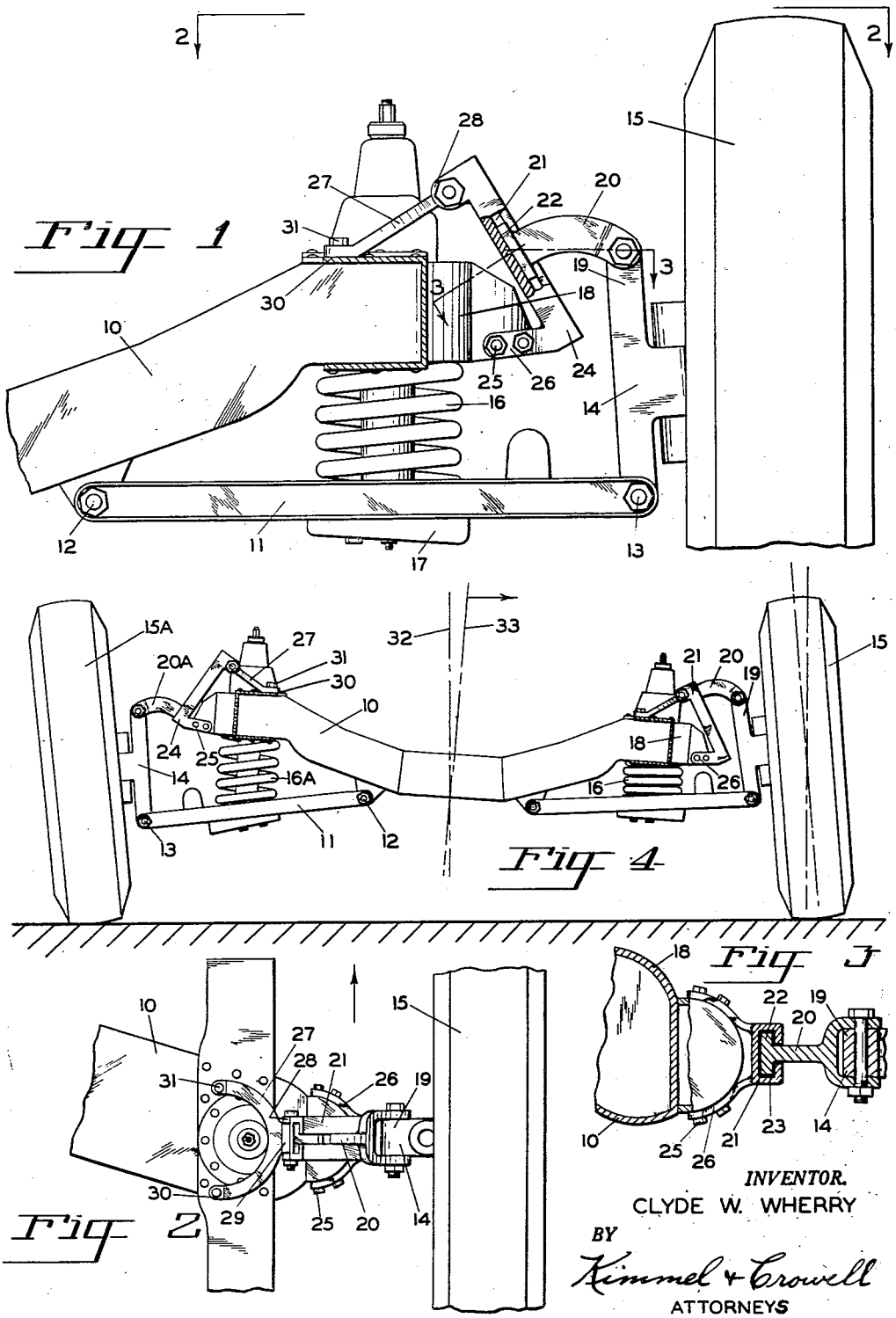
INVENTOR.
CLYDE W. WHERRY
BY
Kimmel & Crowell
ATTORNEYS

United States Patent Office 2,788,965
Patented Apr. 16, 1957

2,788,965
KNEE ACTION MOUNTINGS

Clyde W. Wherry, Portland, Oreg.

Application May 17, 1954, Serial No. 430,259

1 Claim. (Cl. 267—20)

This invention relates to knee action mountings and is particularly adapted for the mounting of front wheels of vehicles.

The primary object of the invention is to change the camber of the front wheels while making turns, changing the camber so that the wheels lean against the turn.

A further object of the invention is to change the camber of the wheels corresponding to the rate of speed of the vehicle while making a turn. The greater the speed the more camber will be given to the front wheels of the vehicle while making the turn.

These and other incidental objects will be apparent in the drawings, specification and claim.

Referring to the drawings:

Figure 1 is a detail front view of the front end of a frame of a vehicle as it relates to the knee action mounting of the front wheels, parts broken away for convenience of illustration.

Figure 2 is a plan view of Figure 1, taken on line 2—2 of Figure 1.

Figure 3 is a lower down plan section of Figure 1, taken on line 3—3.

Figure 4 illustrates the front wheel assembly and frame of a vehicle. It is assumed that a right hand turn is being made. The momentum of the turn tilting the body of the vehicle, and this in turn changing the camber of the wheels as illustrated.

Referring more specifically to the drawings:

The frame of the vehicle is indicated by numeral 10. The standard or usual A-frame 11 as commonly used in knee action suspension of wheels is pivotally mounted at 12 and pivotally connected at 13 to the steering knuckle 14 of the front wheels 15 and 15A. The frame 10 is supported by the springs 16, which have their lower ends resting in the spring mountings forming part of the A-frame 11 and their upper ends nested within the special spring receiving sockets 18 forming part of the frame 10.

My invention consists of connecting the upper end 19 of the steering knuckles 14 to a slidably mounted arm 20 and arm 20A. The flanged bases 22 of the arms 20 are slidably mounted within guideways 21. The lower ends 24 of the guideways 21 are bolted to the frame 10 at 25 by way of the brackets 26, while the upper end of the guideways are braced and supported to the frame by the U-shaped braces 27.

The guideways 21 have ears 28 embracing the end 29 of the brace 27, as best illustrated in Figures 1 and 2, while the opposite end of the brackets 27 are fixedly secured to the frame 10 at 30 by any suitable means, as the bolts 31.

The center line of the body of the vehicle is indicated by numeral 32, when the vehicle is travelling in a straight line. The center line 33 indicates the center line of the body of a vehicle while making a right hand turn.

I will now describe how my new and improved knee action mounting operates. In Figure 4, we are looking into the front of the vehicle and the same is making a right hand turn. The center line of the vehicle has moved to the position shown by the center line 33 in the direction of the arrow. When this happens the spring 16 is compressed by the lowering of the left hand side of the body of the vehicle. The spring 16A will take the position shown, allowing the right hand side of the body of the vehicle to raise.

When this happens the arms 20 will raise towards the top of the guideways 21, thereby pulling the top of the steering knuckle inward towards the frame of the vehicle. This will cause the camber of the wheel 15 to take the position as illustrated in Figure 4, banking the wheels against the momentum of the turning of the vehicle, as shown by the center lines through the wheels.

At the same time the arms 20A on the opposite side of the vehicle will be lowered in the guideways 23 of the guideways 21, forcing the upper end of the steering knuckles 14 to move outwardly from the frame of the vehicle, changing the camber of the wheel 15A so as to resist the momentum of the vehicle making the turn, therefore it can be understood as the body of the vehicle leans in either direction, the camber of the front wheels will be changed so that the wheels will be leaning against the turn instead of leaning with the turn, as is now the case in modern day knee action mountings.

Under actual conditions, the guideways 21 would be enclosed by suitable covers, not here shown.

What is claimed is:

A knee action mounting for vehicle wheels comprising a lower A-frame member pivotally secured at its inner end to the vehicle frame, an upwardly projecting steering knuckle support pivotally secured to the outer end of the A-frame, an upwardly and substantially inwardly inclined guide plate fixed relative to the vehicle frame, a pair of opposed L-shaped flanges extending from opposite side edges of said guide plate, said flanges forming with said guide plate a T-shaped guide slot, a T-shaped slide member engaging in said T-shaped guide slot, an arm fixed to said slide member and extending outwardly therefrom, means pivotally securing said arm to the upper end of said steering knuckle support, and a spring disposed between said A-frame and the vehicle frame, said inclined guide plate serving to tilt the vehicle wheel inwardly when moved upwardly with relation thereto.

References Cited in the file of this patent

UNITED STATES PATENTS

| 1,976,409 | Nutt | Oct. 9, 1934 |
| 2,124,087 | Smith | July 19, 1938 |
| 2,355,274 | Castiglia | Aug. 8, 1944 |

FOREIGN PATENTS

| 232,240 | Germany | Mar. 10, 1911 |
| 712,045 | France | July 13, 1931 |